US008850122B2

(12) United States Patent
Chockler et al.

(10) Patent No.: US 8,850,122 B2
(45) Date of Patent: *Sep. 30, 2014

(54) CACHE OPTIMIZATION VIA PREDICTIVE CACHE SIZE MODIFICATION

(75) Inventors: Gregory Chockler, Haifa (IL); Guy Laden, Jaffa (IL); Ýmir Vigfússon, Reykjavik (IS)

(73) Assignee: International Business Machines Corporation, Armonk, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/306,996

(22) Filed: Nov. 30, 2011

(65) Prior Publication Data

US 2013/0138889 A1     May 30, 2013

(51) Int. Cl.
*G06F 12/08*     (2006.01)

(52) U.S. Cl.
CPC ................... *G06F 12/0866* (2013.01)
USPC ..................... 711/129; 711/170; 711/E12.041

(58) Field of Classification Search
CPC ............................. G06F 12/0866; G06F 12/08
USPC .................. 711/129, 170, E12.041, E12.002
See application file for complete search history.

(56) References Cited

U.S. PATENT DOCUMENTS

| | | | |
|---|---|---|---|
| 6,601,143 B1 * | 7/2003 | Lamparter ..................... | 711/134 |
| 6,748,487 B1 * | 6/2004 | Takamoto et al. ............. | 711/113 |
| 7,831,796 B2 | 11/2010 | Bansal et al. | |
| 2007/0088915 A1 * | 4/2007 | Archambault et al. ....... | 711/137 |
| 2010/0281216 A1 | 11/2010 | Patel et al. | |
| 2012/0005431 A1 * | 1/2012 | Gross et al. ................... | 711/130 |
| 2012/0041914 A1 * | 2/2012 | Tirunagari .................... | 706/15 |
| 2012/0136602 A1 * | 5/2012 | Hossain et al. ................ | 702/85 |

OTHER PUBLICATIONS

Moinuddin K. Qureshi and Yale N. Patt, "Utility-Based Cache Partitioning: A Low-Overhead, High-Performance, Runtime Mechanism to Partition Shared Caches", 39th Annual IEEE/ACM International Symposium on Microarchitecture, 2006. MICRO-39, pp. 423-432, Dec. 2006.
Mattson et al.,"Evaluation techniques for storage hierarchies", IBM Systems Journal, vol. 9, Issue 2, pp. 78-117, 1970.
Kedzierski et al., "Adapting cache partitioning algorithms to pseudo-LRU replacement policies", In Proceedings of IEEE International Symposium on Parallel & Distributed Processing (IPDPS), pp. 1-23, Atlanta, GA, 2010.

* cited by examiner

*Primary Examiner* — Pierre-Michel Bataille
(74) *Attorney, Agent, or Firm* — Jason H. Sosa; Suzanne Erez

(57) ABSTRACT

Systems and methods for cache optimization, the method comprising monitoring cache access rate for one or more cache tenants in a computing environment, wherein a first cache tenant is allocated a first cache having a first cache size which may be adjusted; determining a cache profile for at least the first cache over one or more time intervals according to data collected during the monitoring, analyzing the cache profile for the first cache to determine an expected cache usage model for the first cache; and analyzing the cache usage model and factors related to cache efficiency for the one or more cache tenants to dictate one or more constraints that define boundaries for the first cache size.

20 Claims, 6 Drawing Sheets

CACHE OPTIMIZATION VIA PREDICTIVE CACHE SIZE MODIFICATION

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to optimizing a cache mechanism in a computing environment and, more particularly but not exclusively, to a method or system for profiling and estimating cache efficiency by collecting statistics corresponding to successful cache usage rates.

BACKGROUND

In computing systems, a cache mechanism may be utilized to improve data access speeds. This is accomplished by way of temporarily copying certain target data stored in a primary data storage area (i.e., auxiliary memory) to a secondary data storage area (i.e., cache memory). Cache memory can be accessed faster than the auxiliary memory, thereby supporting faster data processing speeds.

Due to cost issues, size of cache memory is generally substantially smaller than the auxiliary memory. Therefore, when the cache gets full, a caching algorithm or policy is used to evict older cached data in order to provide room for new data that needs to be copied to the cache. Caching algorithms are utilized to determine a replacement policy that would optimize the use of the caching mechanism with an eye toward increasing the underlying system's performance.

In general, better performance can be achieved by increasing the size of the cache. After a certain level, however, the gained increase in performance may be insufficient to justify further increases in the cache size considering the associated costs. Therefore, it is desirable to determine in advance whether modifying the cache size would result in better performance and how to best implement cache size modification.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for cache optimization comprises monitoring cache access rate for one or more cache tenants in a computing environment, wherein a first cache tenant is allocated a first cache having a first cache size which may be adjusted; determining a cache profile for at least the first cache over one or more time intervals according to data collected during the monitoring, analyzing the cache profile for the first cache to determine an expected cache usage model for the first cache; and analyzing the cache usage model and factors related to cache efficiency for the one or more cache tenants to dictate one or more constraints that define boundaries for the first cache size.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

Figure 1:
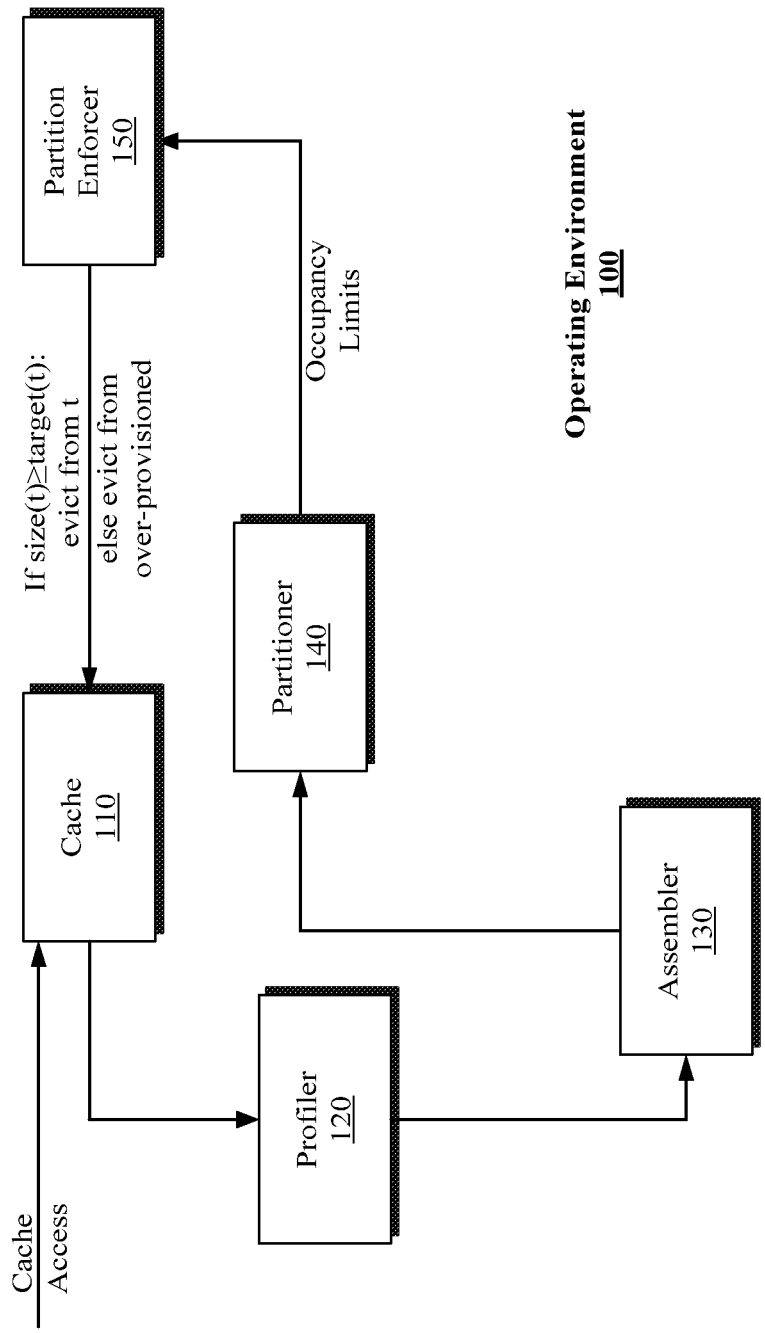
FIG. 1 illustrates an exemplary computing environment in accordance with one or more embodiments, wherein an improved cache mechanism is utilized to enhance caching performance in the computing environment.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one embodiment, caching behavior in a system is monitored and profiled to determine the extent with which the system's performance or quality of service (QoS) would improve or degrade if the cache size was modified. The metric of quality may be based on the cache hit rate and, optionally, based on the assumption that the system's workload will remain relatively constant.

A cache hit refers to successfully servicing a request to access target data in the cache. This is in contrast to a cache miss, where the requested data is not in the cache and instead will have to be copied into the cache from auxiliary memory or another source. If the cache is full, then the requested data replaces another cached item according to a cache replacement policy.

Cache performance, in one embodiment, is evaluated based on an understanding of the cache replacement policy which dictates data eviction or retention, depending on the availability of space in the cache and other factors such as how recently or frequently a cached item is used. In one example, an estimation of the hit rate for various cache sizes is used to build a cache profile that would help predict the change in performance, if the cache size was to be modified, without actually making the modification.

In one embodiment, a cache may be implemented according to a least recently used (LRU) policy. In this implementation, the least recently used data item in the cache is replaced, when a cache miss occurs. The data structure used to implement the cache may be a linked list in which the head of the list is continuously updated to include the most recently hit cached item. As such, the distance between a cached item and the head of the list is an indication of how recently that cached item was subject to a cache hit (i.e., the shorter the distance the most recent the most recent the hit).

As provided in further detail below, based on the above observation, in one embodiment, the hit rate for a certain cache size x may be estimated by tracking or estimating the distance between the location of a cached item that is hit from the head of the list, while taking into account the cache retention or replacement policy. It is noteworthy that in an LRU cache, more than one process may submit a data request to the cache in approximately the same time. Thus, if two cache hits are in close temporal proximity, a contention policy may be used to determine how to update the head of the list.

The combination of the above noted update procedure for the head of the list with the contention issues when a cache hit occurs may result in substantial overhead. Therefore, in one embodiment, a data structure and cache replacement policy is employed that more efficiently manages the cache. In an exemplary embodiment, a data structure hereafter referred to as a "clock" is used to organize the cache. The clock has a functionally circular nature, wherein cached items 1 through N are respectively represented by positions 1 through N in a linear but conceptually circular array such that positions 1 and N are neighbors. Each position logically but not necessarily structurally has two neighbors.

To track the hit rate in the clock implementation, an indicator (e.g., a reference bit) is associated with each position in the clock. When a data item is first copied into the cache, the associated reference bit for the corresponding position in the clock is set to off (e.g., 0). When a cached item is hit, the associated reference bit is set to on (e.g., 1). When a cache miss occurs, a replacement is performed by moving a pointer from a current clock position in a first direction (e.g., clockwise direction) until a target clock position with a reference bit set to off is found. The reference bits associated with entries with reference bit set to on are turned off as the pointer moves passed the entries to find the reference bit set to off.

In one or more embodiments, once the entry with the reference bit turned off is found, the cache content in that entry is selected for eviction, and is replaced with the requested data. As such, in the above implementation, cache items with a corresponding reference bit set to off are deemed to be the least recently used; and cache items with a reference bit set to on are deemed to be the most recently used and depending on implementation may also reflect the most frequently used cached items.

In one embodiment, the above scheme is configured to estimate the hit rate for a clock implemented cache for one or more target cache sizes by profiling the current caching activity and using an existing instance of the cache replacement policy, without having to emulate multiple instances of the cache replacement for caches of different sizes. The profiling data is used to estimate the cache hit rates for said one or more target cache sizes based on statistics gathered about the current cache hits and misses and the respective overtime decay as adapt to changing workloads. In other words, the number of hits for cache items at known (or approximated) distances from the head of the list is collected. Based on said statistics, the potential number of cache hits for a cache of different sizes is extrapolated.

As provided in further detail below, in one example, a function based on the cache size and a designated parameter is used to collect the statistics for estimating the hit rate for a cache of size x. Depending on implementation, the value of the designated parameter (hereafter "k") may be calculated based on the number of cache items which are deemed as least recently used. For example, the value of k may be calculated by subtracting the number of items x in the cache from value A which represents the number of active items in the cache (i.e., k=x−A). The active cache items are entries that are associated with a reference bit that is set to on, for example, indicating the the corresponding cache item was recently hit.

In one embodiment, it is approximated how well the cache will perform in terms of hit rate if the cache size is reduced. If there are k active entries in the cache with the reference bit set to on, for example, then it may be extrapolated that the cache entry would have had a hit if there were k or more entries stored in cache 110. In other words, the relative recency of entries in a clock implemented cache may be estimated by looking at the total number of active entries.

As such, in one embodiment, a cache hit i in a clock implemented cache, where $k_i$ entries have been recently used, implies that a cache hit would also happen if the cache was of size at least $k_i$. It can be estimated that the expected number of hits to a cache of size s will be the sum of $1/k_i$ for one or more hits i where $k_i$ does not exceed s. In an example embodiment, it is assumed that a hit would happen uniformly at random in the first $k_i$ entries. In alternate embodiments, other distributions may be supported. To perform estimates beyond the current size of the cache, the method of least squares or suitable alternatives may be utilized.

The method of least squares refers to an approach to approximate the solution to a linear system with more equations than unknowns, such as the cache mechanism provided above. The term "least squares" means that the overall solution minimizes the sum of the squares of the errors made in solving every single equation in the linear system. One or more exemplary embodiments implementing the above disclosed schemes are provided below with some detail to further clarify one or more aspects of the disclosed subject matter.

Referring to FIG. 1, an exemplary operating environment 100 is illustrated that, as shown, includes a cache 110 with a clock replacement policy, a profiler 120, an assembler 130, a partitioner 140 and a partition enforcer 150. Profiler 120 is a mechanism that, optionally on a continuous basis, gathers statistics about the hit rate and occupancy of a clock implemented cache during regular operations. In the following, it is assumed that the data associated with each cache entry is of fixed size (e.g., page replacement systems for virtual memory, virtual machine memory over-commit, paged database storage, etc.).

It is noteworthy, however, that in embodiments where the objects are of variable sizes (e.g., web caching, application level caching in web apps, etc.), a straightforward generalization of the following approach may be used to associate each object with the number of pages, and treat each hit as a hit to each of those pages. In other words, the embodiments that support variable cache size entries may execute multiple instances of the mechanisms provided in further detail below simultaneously on each hit.

On a cache hit, to improve the synchronization of the hit rate profiling, time moves in implicit epochs. An epoc refers to a segment in time for which the cache related statistics collected by the profiler 110 are analyzed by the assembler 130. In certain embodiments, real-time size epochs (e.g., 5 minutes) may be used. After each epoch, the statistics that have been gathered are decayed by a background thread executed by the assembler 130. This ensures that changes to the popularity distributions are detected. To improve synchronization, the hit statistics collection may be partitioned into fixed sized epochs whose length could be expressed in either number of hits, or in real time (e.g., 5 minutes).

Figure 2:
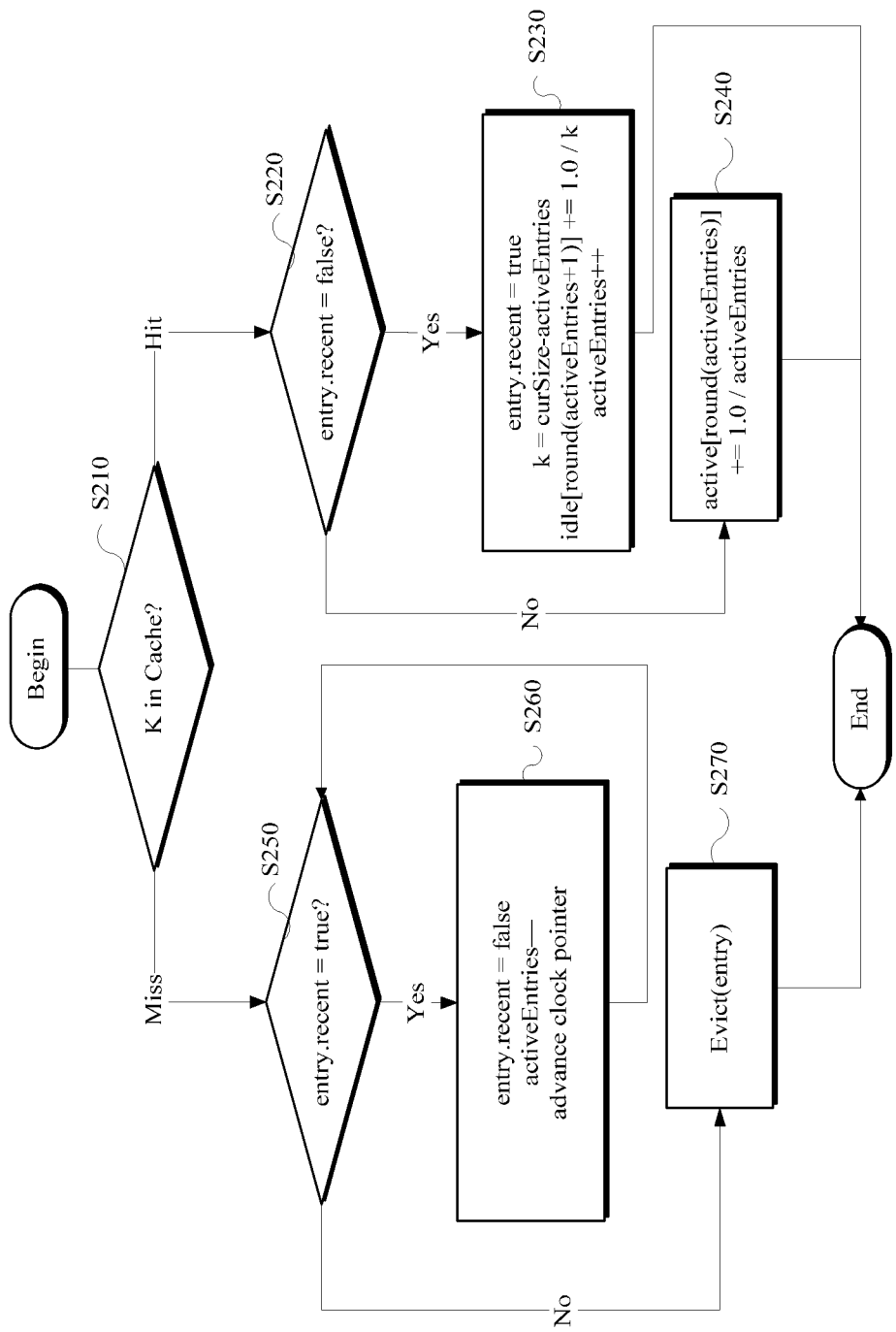
FIG. 2 is a flow diagram of an exemplary method for gathering statistics about the hit rate and occupancy of a clock implemented cache, in accordance with one embodiment.

In one embodiment, after each epoch, the assembler 130 decays statistics that have been gathered within that epoch using exponential average, for example, by the background thread as described in further detail below. This ensures that changes to the popularity distributions are detected. Referring to FIG. 2, within each epoch, the hit statistics are recorded and stored by the profiler 120 according to the pseudo code below, where k refers to a key used to request retrieval of associated data from cache 110:

```
[k in cache --> CACHE HIT]                                    (S210)
find entry[k]
if entry.recent = false:                                      (S220)
        entry.recent = true [set the clock entry for the cache hit to on]
        k = curSize-activeEntries [k = x - A]
        idle[round(activeEntries+1)] += 1.0 / k
        activeEntries++                                       (S230)
        end
else:
        active[round(activeEntries)] += 1.0 / activeEntries   (S240)
end
```

In the above, function round(X) returns the value (int)(X/(float)DELTA) which ensures that statistics are gathered at a granularity of DELTA. Where DELTA denotes the size increments for the partitioner 140 as provided below. A smaller DELTA means more accurate measurements but that more memory must be spent on gathering statistics.

Idle and active arrays noted in the above pseudo code are respectively utilized to track the number of hits to non-recent and recent entries, which have occurred during the current statistics collection epoch, where there are x non-recent and recent entries in the cache. In more detail, activeEntries is used as a counter for the number of recently accessed cache items (i.e., number of cache entries with a reference bit set to one, for example).

If a non-recently accessed cache item, as designated by a reference bit set to off, is hit, then an entry in the idle array is incremented to track the number of non-recently used cache entries that are hit in the cache of size x. On the other hand, if a recently accessed cache item, as designated by a reference bit set to on is hit, then an entry in the active array is incremented to track the number of recently used cache entries that are hit in the cache of size x.

The idle and active arrays are desirably large enough to account for the full range of utilization values (i.e., each fit curSize/DELTA entries). In an examplary implementation, sparse arrays are utilized to maintain pairs <$k_i$, #hits> for the entries $k_i$ that have been actually hit. This mechanism advantageously reduced the memory footprint significantly.

Referring back to FIG. 2 and the following example pseudo code, on a cache miss, the clock pointer is advanced. If the visited cache entry is active, as indicated by the corresponding reference bit being set to on, then the value of the corresponding reference bit is flipped to off, and the number of active cache items is decremented. Otherwise, if the cache item visited is inactive as indicated by an off reference bit (e.g., "false"), then the inactive cache entry is evicted and a counter that monitors the number of cache misses is incremented:

```
[k NOT in cache -->CACHE]                                     (S250)
if entry.recent = true:
        entry.recent = false
        activeEntries--
        advance clock pointer
        repeat until entry.recent = false                     (S260)
else:
        evict(entry)                                          (S270)
        end
```

In the following, the entries in the cache whose data have been recently evicted, but for which the identifier of the data item is kept in the cache in order to detect possible future references are referred to "ghost entries" for brevity. The ghost entries help predict what effect the space allocated beyond the currently used one will have on the cache hit rate. From the perspective of profiling, the ghost entries are treated identically or similarly to the idle entries in accordance with one embodiment. However, a mechanism is provided to limit the number of ghost entries in the cache. The mechanism, in one implementation, maintains the number of ghost entries to be, for example, approximately equal to the number of none ghost entries.

Across epochs, the statistics gathered by the profiling process above are accumulated in one or more data structures (e.g., the savedActive and savedIdle arrays). In one embodiment, assembler 130 utilizes a background thread for manipulating and decaying statistics gathered by the profiler 120 over time. In addition, the background thread advances a pointer pointing to a ghost entry to remove data from memory and to bound the memory consumption of the cache 110 when needed.

Figure 3A:
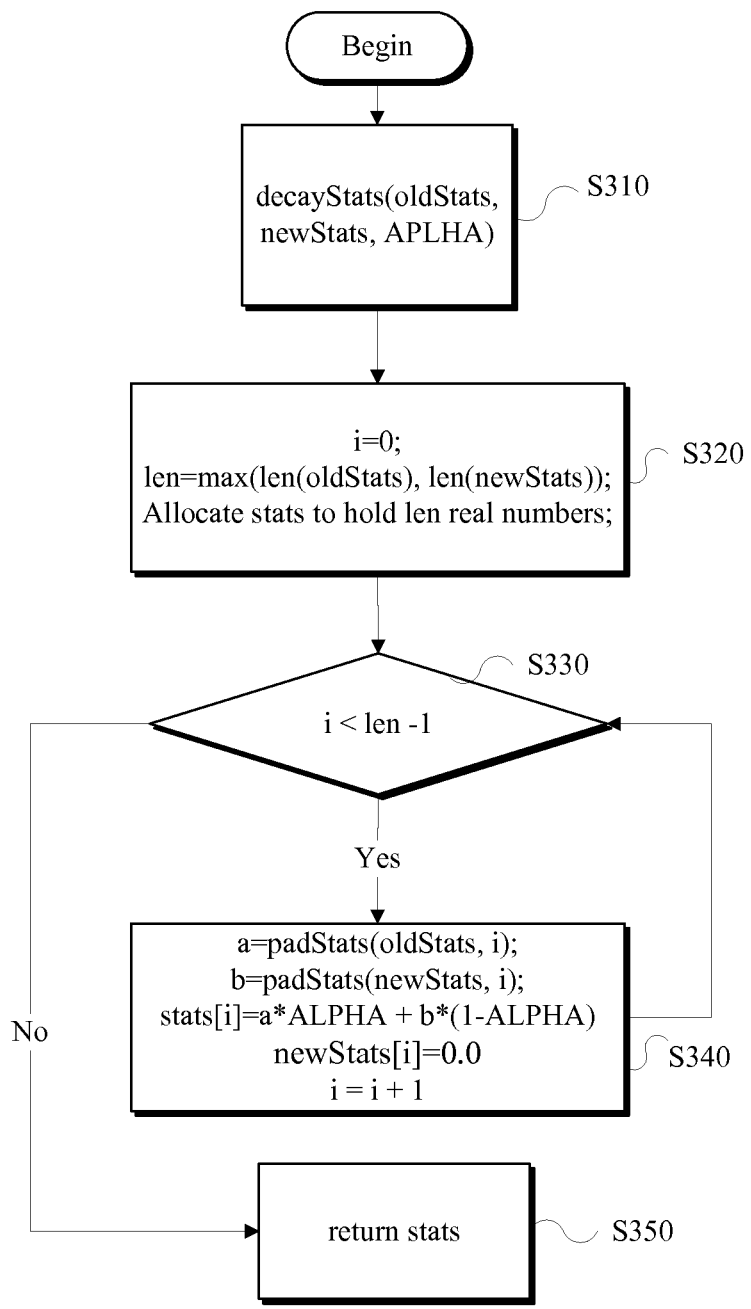
FIGS. 3A and 3B illustrate flow diagrams of exemplary methods for optimizing a cache based on the hit rate and periodicity, in accordance with one embodiment.
Figure 3B:
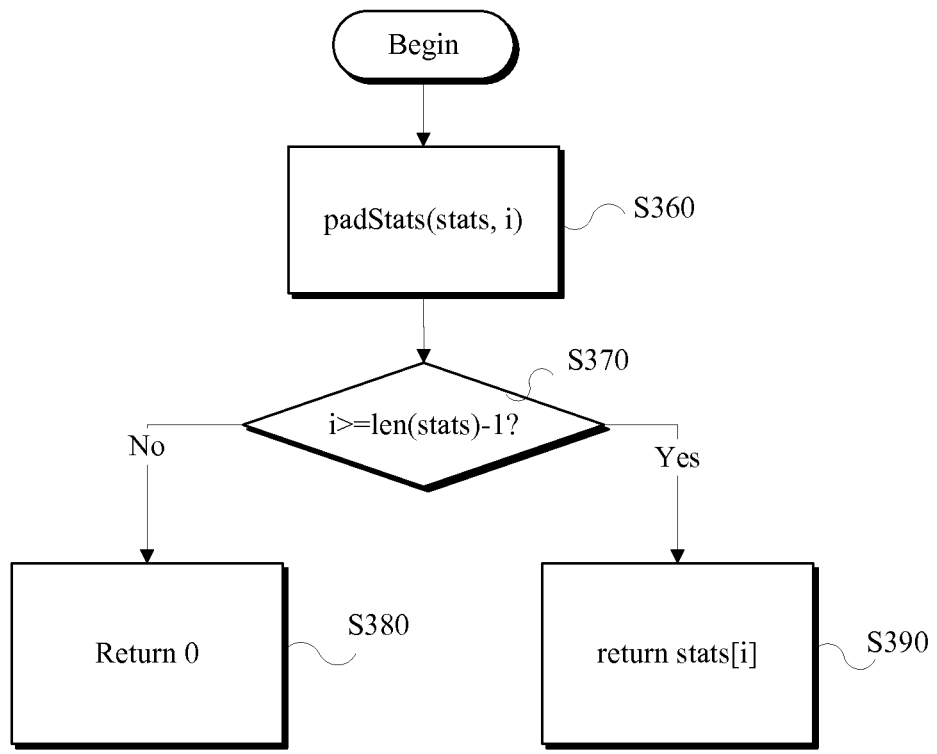

The background thread may be executed by assembler 130 at the end of statistics collection epochs. When the thread is executed, it scans the savedActive and savedIdle arrays, decays the existing values using exponential average, for example, and folds in the new values collected during the last epoch. For example, ALPHA may be set as a decay constant between 0 and 1, for example, representing how quickly old values are diluted. Referring to FIGS. 3A and 3B, determining the ideal ALPHA value depends on the hit rate and the periodicity between runs as provided below:

```
savedActive = decayStats(savedActive, active, ALPHA);
savedIdle = decayStats(savedIdle, idle, ALPHA);
decayStats(oldStats, newStats, ALPHA):                        (S310)
    len = max(len(oldStats), len(newStats))
    Allocate array stats to hold len real numbers;            (S320)
    for i in 0 to len - 1:                                    (S330)
        a = padStats(oldStats, i);
        b = padStats(newStats, i);
        stats[i]=a*ALPHA + b*(1-ALPHA)
```

```
        newStats[i]=0.0                          (S340)
    return stats;                                (S350)
padStats(stats, i):                              (S360)
    if (i >= len(stats)−1)                       (S370)
        return 0;                                (S380)
    else
        return stats[i];                         (S390)
```

In accordance with one or more embodiments, after the background thread has traversed cache 110, assembler 130 is utilized to process the statistics gathered by profiler 120 and to convert the statistics to a useful representation for partitioner 140 which consumes the mapping of cache sizes to the hit rate estimates for each cache tenant produced by the profiler 120 and assembler 130. Partitioner 140 outputs the allocation boundaries for each tenant. An exemplary partitioner 140 may take into account the desired quality of service guarantees, such as maximizing the total hit rate. Cache partitioning benefits from the profiling technique disclosed here. The profiling technique may be also used in cost-benefit analysis associated with allocating more or less space in a cloud-based caching service (e.g., Amazon Elastic Cache).

Depending on implementation the following assumptions may be made:
1) A hit when there are k recently used entries could have been to any of the front k entries in the cache (uniformly at random).
2) Resizing the cache size from s to s'<s means that the new cache will include the most recent s' entries from the old cache. This is optimistic, since it could be that some of the s' entries will be removed from the cache in favor of other items.
3) That the hit rates in the last few epochs predict the future. Without foresight, this is about as well as we can do with any cache replacement policy.
4) The current size doesn't change between the epochs because current size may be determined based on the performance profile collected during the epoch. In some embodiments, the algorithm may be modified so it won't be sensitive to this assumption.

```
i = 0
accessArray = [ ]
sum = 0.0
[Access at k: 1/k probability from 0 to k]
for i in len(savedActive)−1 downto 0:
    sum = sum + savedActive[i]
    accessArray[i] = sum
sum = 0.0
[Access to k: 1/(S−k) probability from k to S for cache size S]
for i in 0 to len(savedIdle)−1:
    sum = sum + savedIdle[i]
    accessArray[i] += sum
[Assemble the CDF]
sum = 0.0
for i in 0 to len(accessArray)−1:
    sum = sum + accessArray[i]
    accessArray[i] = sum
```

In the cache mechanism discussed above, a function is utilized that estimates the hit rate at any cache size x, which is the total number of distinct items accessed, including those cached, and those not currently in the cache. Said function may in turn be used for cache partitioning or other profiling of the cache use. A memory block may correspond to the size of a memory cell, equal to the page size. The value of x will be a multiple of DELTA.

```
estimateHitrate(size x):
    if x <= curSize:
        [Estimate using the cdf histogram]
        return accessArray[round(x)]
    else:
        [Estimate using the curve fit]
        return log(x+1) * hits / log(curSize)
```

It is notworthy that, in the above examples, the two estimates (histogram and fitted function) agree on the value at x=curSize, and that the hit rate is the absolute number of hits in contrast to hit ratio which is the number of hits normalized by the total number of cache accesses.

In summary, in accordance with one or more embodiments, profiler 120 is utilized to collect runtime cache usage statistics. Profiler 120 is invoked on every cache hit, and on every iteration of the clock traversal loop executed as a part of the cache miss handling. The profiler 120 thus generates cache usage statistics collected in the course of the profiling epochs in the form of a mapping based on an LRU model stack distance to the estimated number of hits received by the items stored at those distances.

Assembler 130 accepts the cache usage statistics produced by profiler 120 and outputs the cache usage model in the form of number of hits as a function of the cache size. Depending on whether the space in the cache is shared among multiple tenants (e.g., application flows) and given the pertenant quality of service (QoS) requirements (e.g., tenant t1 must have hit rate of at least 80% provided it occupies at most 50 MBytes of cache space) or more general goals (e.g., maximizing the total hit rate), partitioner 140 produces cache allocation constraints for each tenant in the form of a system of linear inequalities (e.g., alloc(t1)>=20 MBytes, alloc(t2)>=1 Mbyte, alloc(t1+t2)<=30 Mbytes, where t1 and >t2 are cache tenants) that will satisfy the target performance goals.

In one embodiment, partition enforcer 150 receives the allocation constraints (i.e., occupancy limits) designated by partitioner 140 and defines a cache replacement policy that will ensure that the tenant space allocation will eventually satisfy the desired constraints. The constraints may be expressed in the form of a system of linear inequalities, and may be either produced by partitioner 140 or dictated by way external administrative inputs.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
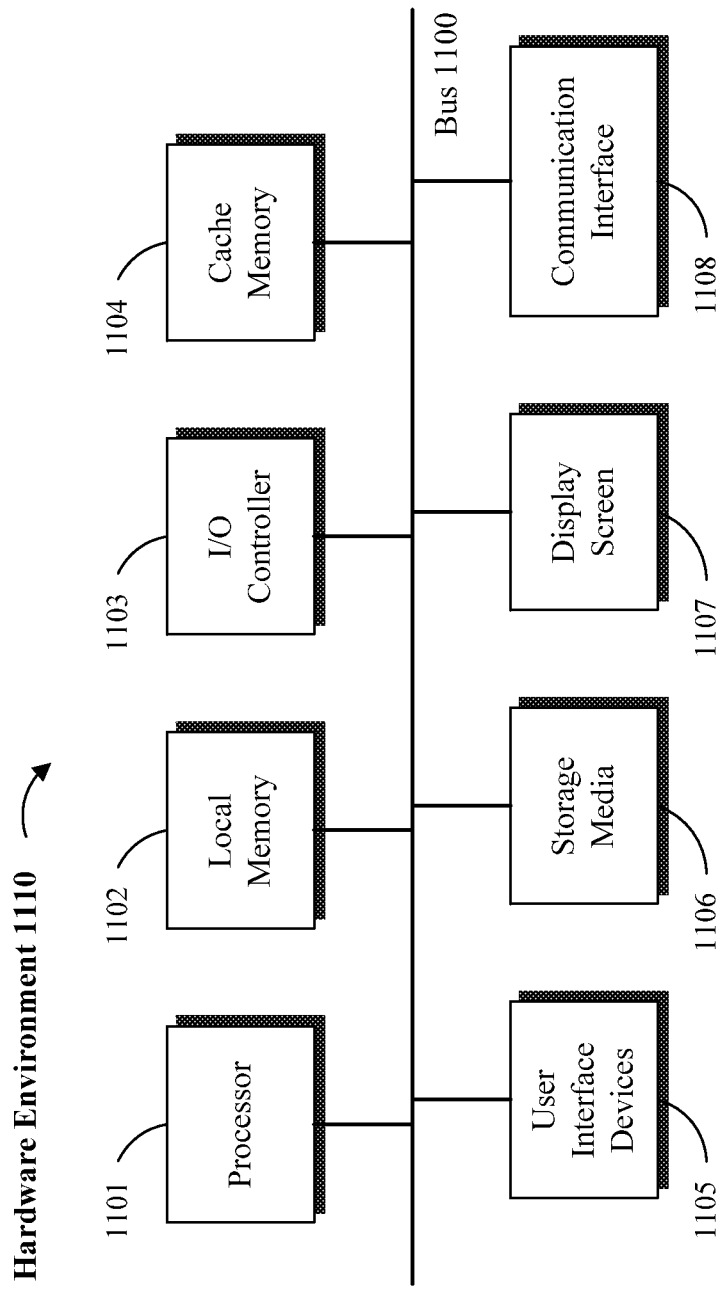
FIGS. 4A and 4B are block diagrams of hardware and software environments in which the disclosed systems and methods may operate, in accordance with one or more embodiments.
Figure 4B:
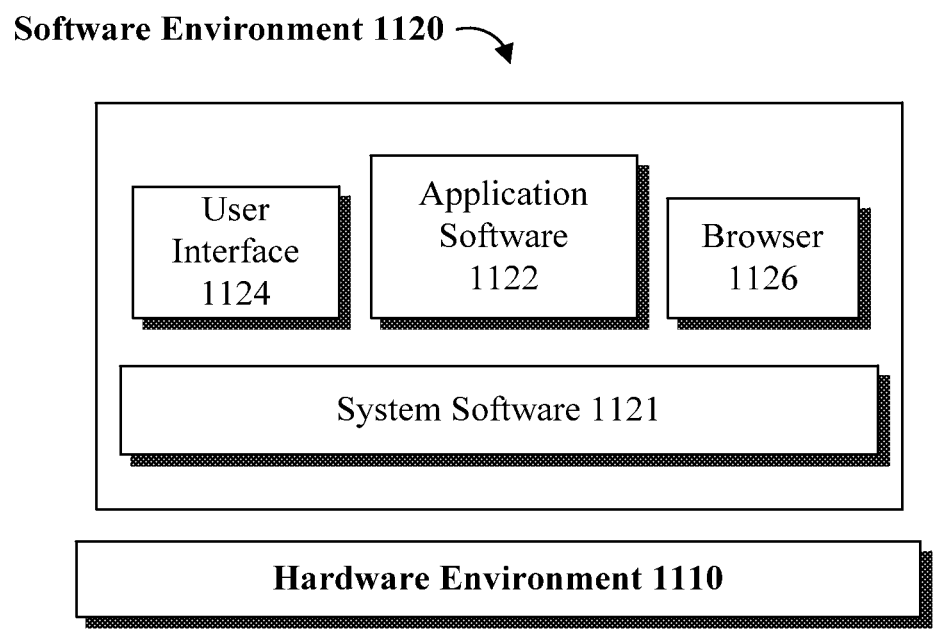

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented cache optimization method comprising:

monitoring cache access rate for one or more cache tenants in a computing environment, wherein a first cache tenant is allocated a first cache having a first cache size which may be adjusted;

determining a cache profile for at least the first cache over one or more time intervals according to data collected during the monitoring, analyzing the cache profile for the first cache to determine an expected cache usage model for the first cache; and analyzing the cache usage model and factors related to cache efficiency for the one or more cache tenants to dictate one or more constraints that define boundaries for the first cache size.

2. The method of claim 1, wherein the cache access rate is the cache hit rate.

3. The method of claim 1, wherein the cache access rate is the cache miss rate.

4. The method of claim 1, wherein the first cache size is adjusted in real time as the expected cache access rate changes.

5. The method of claim 1, wherein the cache profile provides an estimation of cache access rate for the first cache according to possible changes in the first cache size as projected by a statistical analysis of data collected during the monitoring.

6. The method of claim 1 further comprising aggregating the data collected over a plurality of time intervals to provide a better estimation of how the cache profile for the first cache changes over time.

7. The method of claim 1 wherein the model would indicate the cache access rate in relation to changes to the first cache size.

8. The method of claim 1 wherein factors related to cache efficiency comprise overall cache efficiency in the computing environment.

9. The method of claim 1 wherein factors related to cache efficiency comprise individual cache efficiency for the one or more cache tenants.

10. The method of claim 1 wherein the cache usage model for the first cache tenant is constructed based on number of cache accesses to the first cache as a function of the first cache size.

11. The method of claim 1 wherein the one or more cache allocation constraints are generated in form of a system of linear inequalities to satisfy target performance goals for the one or more cache tenants.

12. The method of claim 1 wherein the one or more cache allocation constraints are utilized to control changes in cache size for the one or more caches in the computing system based on quality of service requirements associated with corresponding one or more cache tenants.

13. A system for cache optimization, the system comprising:
    one or more cache mechanisms;
    a profiler for monitoring cache access rate for one or more cache tenants in a computing environment, wherein a first cache tenant is allocated a first cache having a first cache size which may be adjusted;
    the profiler determining a cache profile for at least the first cache over one or more time intervals according to data collected during the monitoring;
    an assembler analyzing the cache profile for the first cache to determine an expected cache usage model for the first cache; and
    a partitioner for analyzing the cache usage model and factors related to cache efficiency for the one or more cache tenants to dictate one or more constraints that define boundaries for the first cache size.

14. The system of claim 13, wherein the one or more cache allocation constraints are generated in form of a system of linear inequalities to satisfy target performance goals for the one or more cache tenants.

15. The system of claim 13, wherein the cache usage model for the first cache tenant is constructed based on number of cache accesses to the first cache as a function of the first cache size.

16. The system of claim 13, wherein the first cache size is adjusted in real time as the expected cache access rate changes.

17. The system of claim 13, wherein the cache profile provides an estimation of cache access rate for the first cache according to possible changes in the first cache size as projected by a statistical analysis of data collected during the monitoring.

18. A computer program product comprising a non-transitory data storage medium having a computer readable program, wherein the computer readable program when executed on a computer causes the computer to:
    monitor cache access rate for one or more cache tenants in a computing environment, wherein a first cache tenant is allocated a first cache having a first cache size which may be adjusted;
    determine a cache profile for at least the first cache over one or more time intervals according to data collected during the monitoring,
    analyze the cache profile for the first cache to determine an expected cache usage model for the first cache; and
    analyze the cache usage model and factors related to cache efficiency for the one or more cache tenants to dictate one or more constraints that define boundaries for the first cache size.

19. The computer program product of claim 18, wherein the cache profile provides an estimation of cache access rate for the first cache according to possible changes in the first cache size as projected by a statistical analysis of data collected during the monitoring.

20. The computer program product of claim 18, wherein the cache usage model for the first cache tenant is constructed based on number of cache accesses to the first cache as a function of the first cache size.

* * * * *